Jan. 29, 1957 J. R. ORELIND ET AL 2,779,260
UNIVERSAL 2-POINT HITCH
Filed Nov. 22, 1952 4 Sheets-Sheet 4
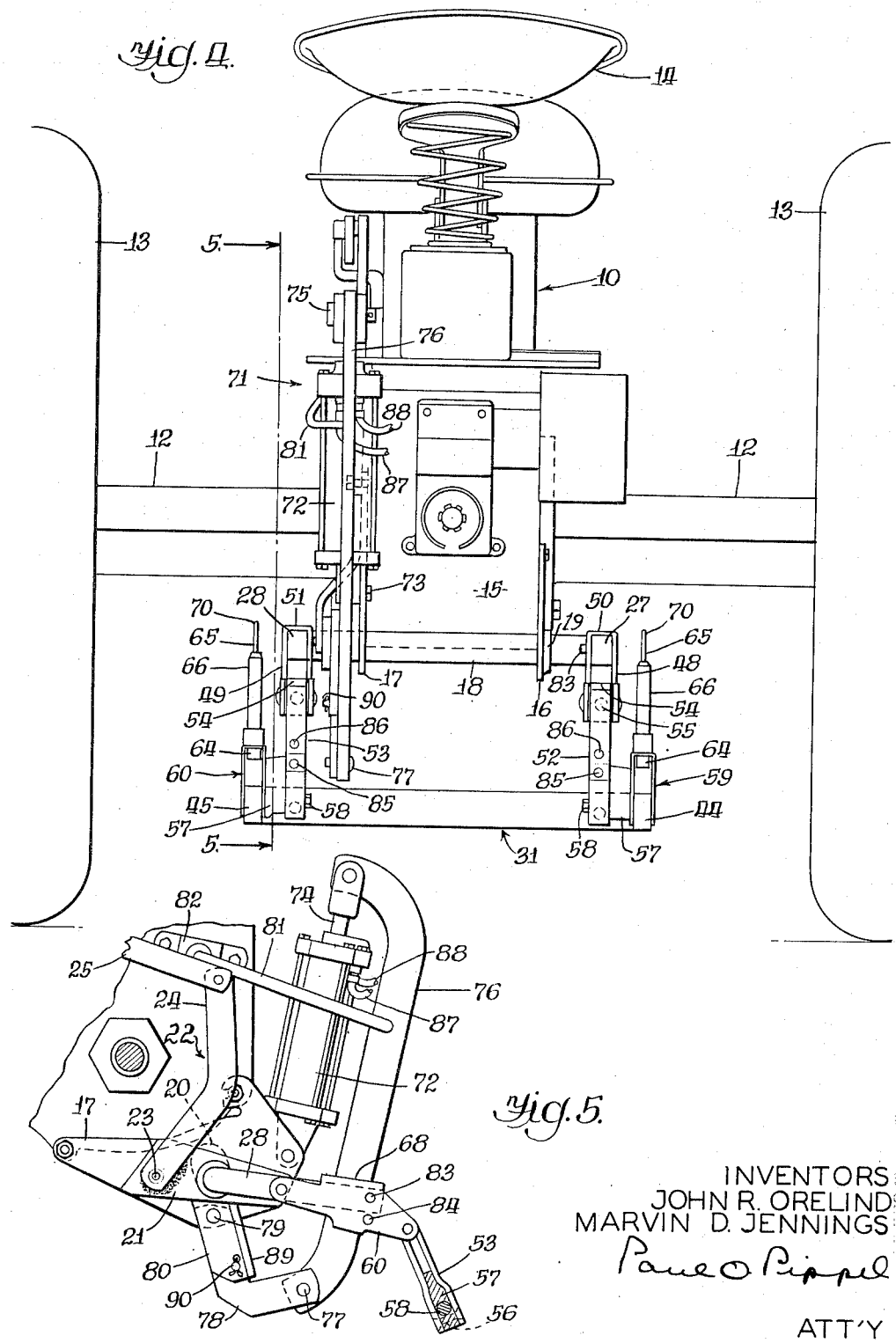
INVENTORS
JOHN R. ORELIND
MARVIN D. JENNINGS
Paul O. Pippel
ATT'Y United States Patent Office 2,779,260
Patented Jan. 29, 1957

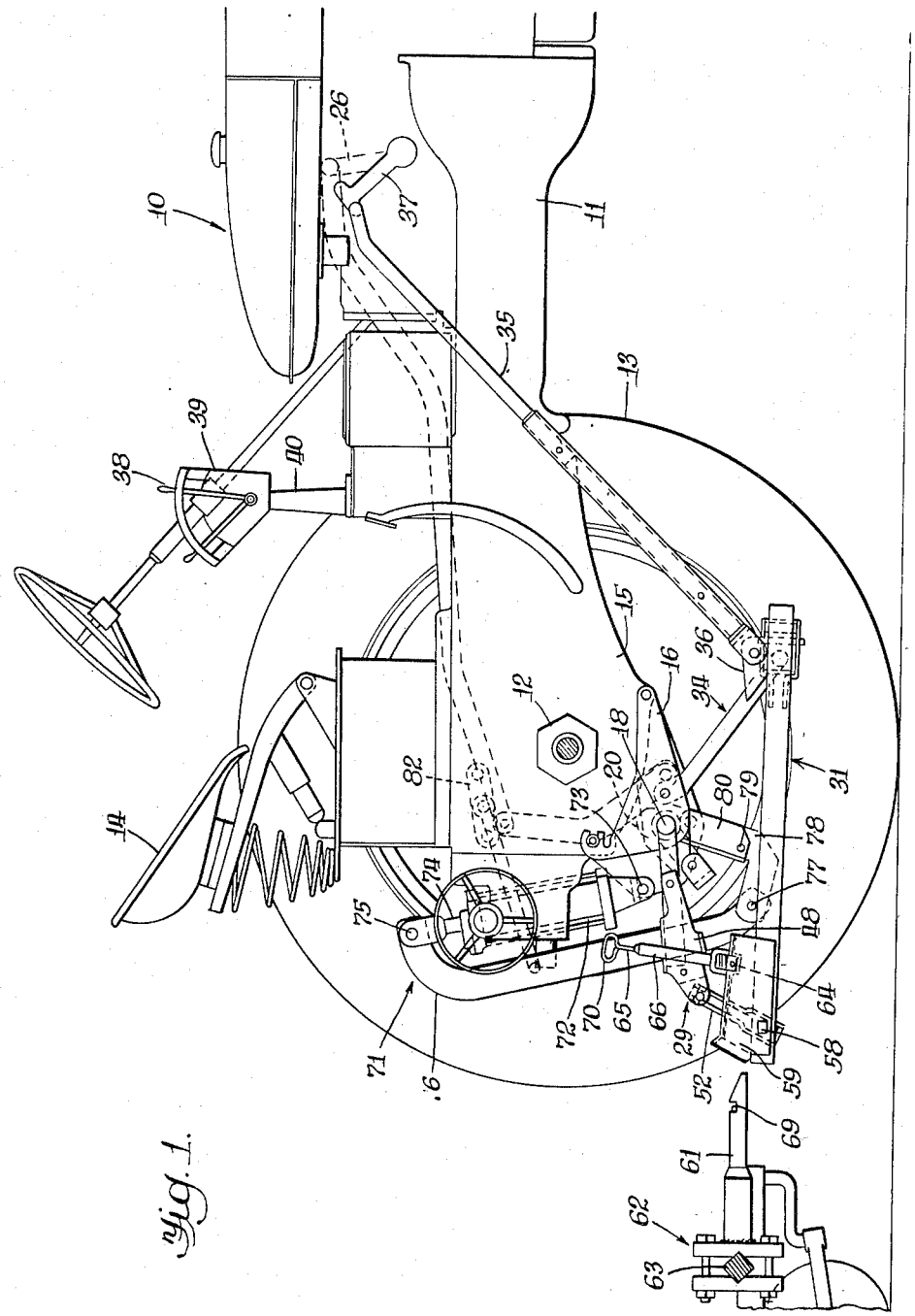

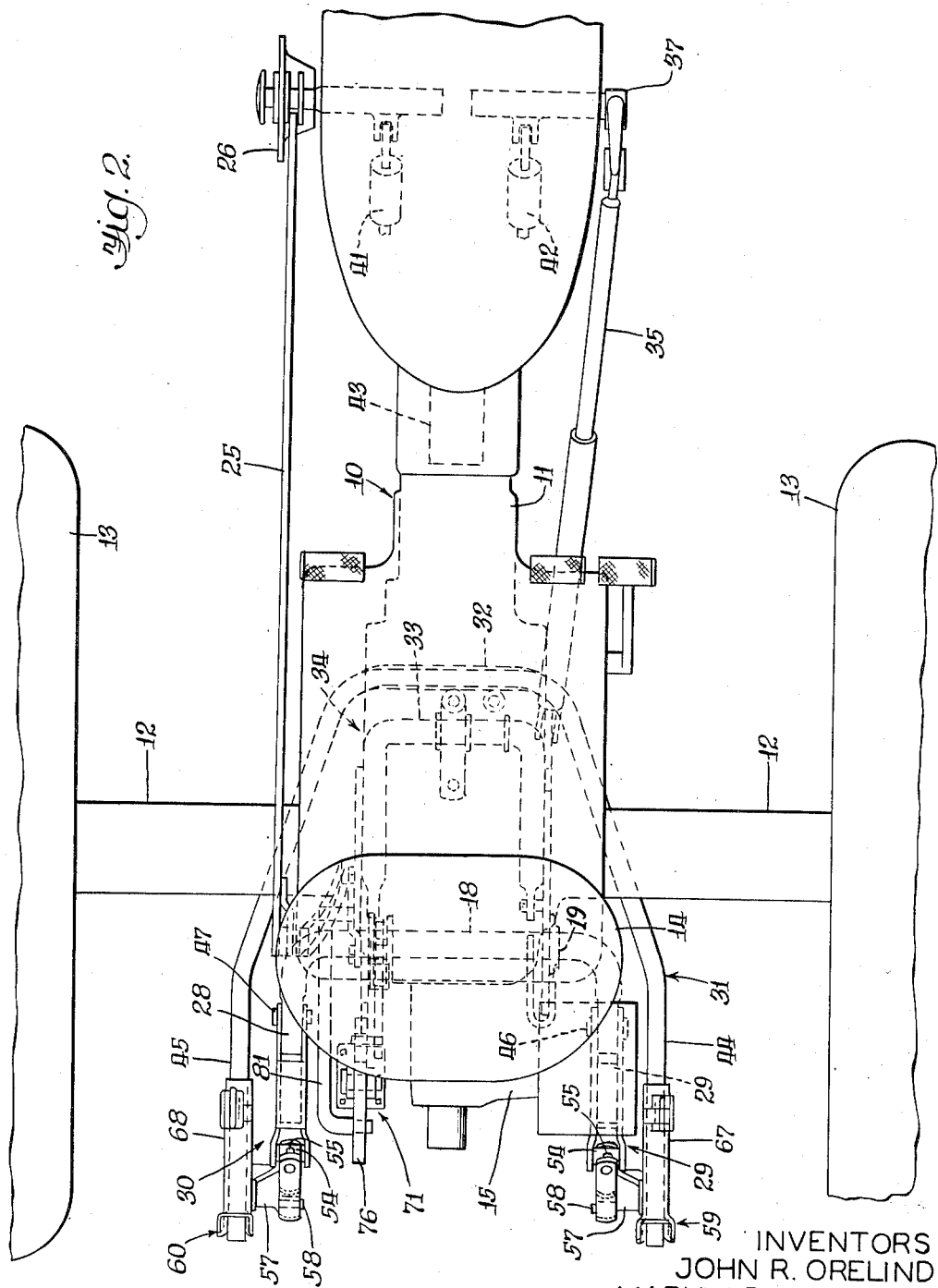

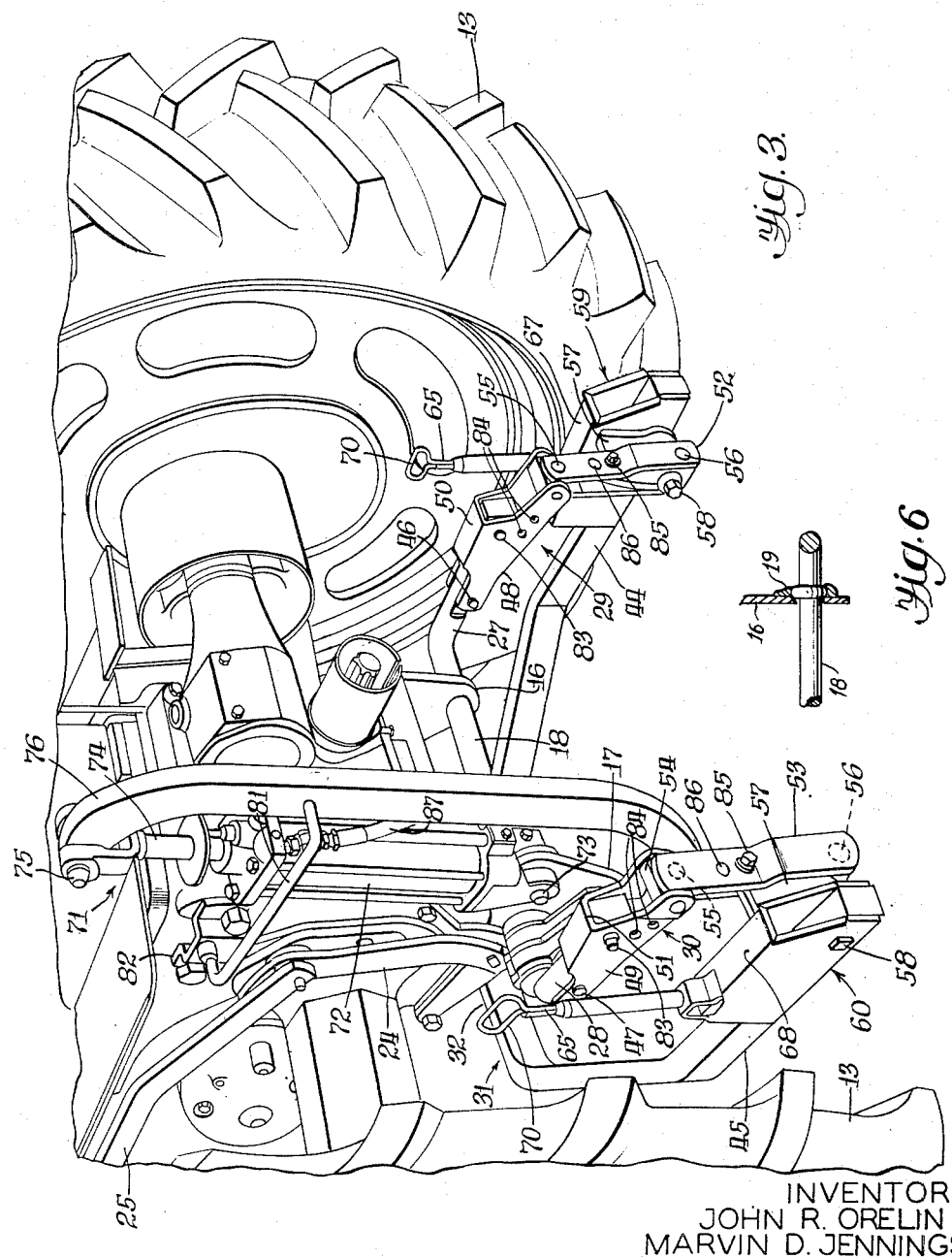

2,779,260

UNIVERSAL 2-POINT HITCH

John R. Orelind, Wilmette, Ill., and Marvin D. Jennings, Memphis, Tenn., assignors to International Harvester Company, a corporation of New Jersey Application November 22, 1952, Serial No. 322,056

7 Claims. (Cl. 97—47.51)

This invention relates to attaching mechanism for mounting implements upon tractors. The principal object of the invention is to provide novel implement attaching mechanism adapted to facilitate the mounting of an implement upon the rear of a tractor.

Another object of the invention is to provide improved implement attaching mechanism for tractors and the like wherein the connection may be made between the implement and the tractor with a minimum expenditure of time and labor on the part of the tractor operator.

Another object of the invention is to provide an implement attaching structure for a tractor of the 2-connecting-point type wherein mating or complementary connecting elements are provided on the tractor and implement accommodating automatic attachment of the implement to the tractor upon approach of the tractor thereto.

The invention is particularly concerned with mechanism for shortening the time usually required to mount implements of various types upon a tractor and to simplify the connecting structure required for a tractor upon which a number of different kinds of implements are to be mounted. A further object of the invention, therefore, is the provision of an improved attaching structure adapted for the attachment to the tractor of a number of different kinds of implements.

Other objects and advantages of the invention will become clear from the following detailed description when read in conjunction with the accompanying drawings, wherein:

Figure 1 is a view in side elevation of the rear portion of a tractor having incorporated therein implement mounting mechanism embodying the features of this invention and illustrating the relationship of an implement thereto;

Figure 2 is a plan view similar to Figure 1 of the implement attaching structure shown therein;

Figure 3 is a view in perspective of the implement attaching structure of this invention;

Figure 4 is a rear elevation of the implement attaching structure shown in Figures 1 and 2, with parts removed for clarity;

Figure 5 is a detail of the implement attaching structure taken on the line 5—5 of Figure 4; and Figure 6 is a detail showing the support for one end of the lifting rock shaft.

In the drawings it will be observed that the implement attaching structure of this invention is mounted upon a tractor designated generally by the numeral 10 having a power plant 11, a transverse rear axle structure 12, drive wheels 13 and an operator's station 14. The mechanism for transmitting drive from the tractor power plant to the rear wheels 13 is enclosed in a housing 15 to opposite sides of which are secured laterally spaced depending supporting plates 16 and 17.

Supporting plate 16 on the right hand side of the tractor housing 15 is provided with an opening to receive one end of a tranverse shaft 18 which is rotatably connected thereto by a ball and socket connection 19 to accommodate universal pivotal movement of the other end of the shaft about its connection to the plate 16. The other end of the shaft is received in a slot 20 formed in the left hand plate 17 to accommodate movement of the left end of the shaft 18 in a generally vertical direction for a purpose hereinafter to be made clear.

The portion of shaft 18 extending laterally beyond the plate 17 is rockably received in an opening provided in one arm 21 of a lever or bell crank 22 pivotally mounted at 23 upon the plate 17. Another arm 24 of the bell crank 22, affixed to arm 21 by welding, has connected thereto the rear end of a rod 25, the forward end of which, as indicated in Figures 1 and 2, is attached to a power transmission arm 26 mounted upon the side of the tractor. Rocking of the arm 26 acting through the rod 25 and the bell crank 22 raises and lowers the right hand end of the shaft 18 about the ball joint 19 connecting the other end of the shaft to the plate 16. The arm 26 is rocked by any suitable mechanism (manual or otherwise) adapted to hold it in an adjusted position, and is preferably hydraulically operated by power derived from the tractor power plant. By virtue of its connection to the bell crank 22 its function is to rock the latter to raise and lower the adjacent end of shaft 18 for the purpose of leveling the drawbar and the attached implement, as will hereinafter appear.

Shaft 18 is bent at its ends in the form of a bail to provide rearwardly extending laterally spaced rock arms 27 and 28 which extend rearwardly from the transverse portion of the shaft and are adapted to swing in a vertical plane upon rocking shaft 18. The arms 27 and 28 are connected by lifting linkages generally designated by the numerals 29 and 30 to a drawbar in the form of a yoke 31 extending under the tractor body between the rear wheels and having a transverse portion 32 at its forward end, in advance of the tractor rear axle housing. Drawbar 31 is pivotally connected to the transverse portion 33 of a bail 34 which, in turn, has its arms pivotally mounted upon the tractor housing 15 and extends forwardly and downwardly therefrom. The forward end of the yoke 31 is thus capable of vertical adjustment by virtue of the pivotal mounting of the bail 34 upon the tractor. Vertical adjustment of the forward end of the drawbar or yoke 31 is effected by a rod 35 pivotally connected at its lower end to a lug 36 secured to the bail 34 and at its upper forward end to a power transmission arm 37 mounted upon the side of the tractor and independently operated in a manner similar to the rock arm 26 on the left hand side of the tractor. This arm 37 is rocked by power derived from the tractor power plant and the operation thereof as well as of the arm 26 is under the control of the tractor operator by the manipulation of one or more control levers 38, mounted upon a quadrant 39 secured to a standard 40 upon the tractor. It may be understood that the power transmission arms 26 and 37 may be operated by ram units such as are indicated in dotted lines at 41 and 42 in Figure 2, receiving fluid under pressure from a suitable pump indicated at 43 deriving power from the tractor power plant.

The laterally spaced arms 44 and 45 of the yoke 31 extend rearwardly below the rock shaft 18, forming draft bars to which the implement is connected, and are attached to the respective linkages 29 and 30 so that the draft bars can be raised and lowered in response to rocking of the shaft 18.

Each of the rock arms 27 and 28 has pivotally mounted thereupon at 46 and 47 respectively, near the forward ends of said arms, a second set of arms in the form of U-shaped sleeves 48 and 49 provided with transverse portions 50 and 51 arranged to engage the upper surface of the respective arms 27 and 28 upon pivoting of said sleeves about their pivots on these arms. Upon downward swinging of the arms 27 and 28, the arms move away from the transverse portions 50 and 51 of arms or sleeves 48 and 49 but engage these transverse portions upon upward swinging of the arms 27 and 28, so that in this direction of movement the sleeves 48 and 49 function as unitary lifting arms with the arms 27 and 28.

Laterally spaced lifting links 52 and 53 are provided. Each of these links comprises longitudinally spaced members between the upper ends of which is mounted a swivel 54 with trunnions by which the lift links are connected to the respective sleeve members 48 and 49 of the rock arms, the links being suspended upon the swivels 54 for swinging movement longitudinally of the direction of travel of the tractor, and being pivotally mounted thereon for lateral swinging by pins 55.

The lower ends of the members comprising the links 52 and 53 have pivotally mounted therebetween upon pins 56 vertically extending lugs or attaching members 57 which are pivoted respectively upon bolts 58 passing through the sides of attaching elements in the form of socket members 59 and 60 and arms 44 and 45. The socket members 59 and 60 are mounted upon the ends respectively of the draft arms 44 and 45 of the drawbar 31. Each of the socket members 59 and 60 is in the form of an inverted U straddling the ends of the respective arms 44 and 45 and providing a rectangular space thereabove adapted to slidably receive complementary rectangularly shaped attaching elements 61 of an agricultural implement such as that shown in Figure 1. The implement is designated by the numeral 62 and may be any desired type of tool adapted for attachment to a tractor. The implement is provided with a tool bar 63 upon which may be mounted different kinds of earth and crop treating tools. In the view of the implement shown in Figure 1 only one of the attaching members 61 is shown although it may be understood that the tool bar 63 upon which the tools are mounted is provided with laterally spaced members 61, one to be received in each of the socket members 59 and 60. It should be clear from the position of the implement shown in Figure 1 with relation to the tractor, that by backing up the tractor the attaching elements 61 will be received in the associated attaching elements or sockets 59 and 60 of the implement attaching structure on the tractor. It may be noted that similar slidable connecting mechanism has been described and claimed in copending U. S. application Serial No. 291,245, now abandoned, filed June 2, 1952.

A detent 64 is provided at the end of a plunger 65 slidably receivable and suitably spring pressed in a housing 66 mounted upon the upper transverse portion 67 or 68 of the respective socket member 59 or 60. An opening is provided in the upper part of the socket portion to receive the detent 64, and upon insertion of the member 61 in the associated socket 59 or 60 the detent 64 will be received in a slot or notch 69 in the upper surface of the member 61, thus locking the member in its socket. To disconnect the implement from the tractor is a simple operation, merely requiring that the operator grasp the rod 65 by its handle 70 and lift to release the detent 64 from the groove 69. The operator then drives the tractor forward and away from the implement. To facilitate entry of the respective members 61 in the sockets 59 and 60 the mouths of these sockets are flared as indicated in the drawings.

When the members 61 are received in the sockets 59 and 60 the implement is firmly attached to the tractor and it may be raised to transport position upon the tractor by rocking the shaft 18 in a clockwise direction as viewed in Figure 1 to swing the arms 27 and 28 and their associated sleeve members 48 and 49 upwardly.

Rocking of the shaft 18 to raise or lower the implement is accomplished by the provision of lifting mechanism generally indicated by the numeral 71 comprising an upright ram unit including a cylinder 72 anchored at its lower end by a pivot pin 73 carried in the plate 17. A piston rod 74 slidable in the upper end of the cylinder 72 extends upwardly therefrom and is mounted upon a pivot pin 75 carried in the upper end of a curved standard 76 extending vertically and generally parallel to the cylinder 72. The lower end of the upright supporting member 76 is pivotally connected at 77 to an L-shaped link 78, which, in turn, is pivotally connected at 79 to a rockable member 80 affixed to the shaft 18. A stabilizer and guide for the ram unit and its support is provided by a link 81 pivotally mounted upon the upright 76 at one end and at its other end to a bracket 82 mounted upon the side of the tractor body.

At this point it should be clear that upon extension of the piston rod 74 in the cylinder 72, upright 76 will move upwardly and, through L-shaped link 78 and member 80, will rock the arms 27 and 28 upwardly to raise the implement.

It has already been pointed out that the sleeve members 48 and 49 are pivotally mounted upon the respective arms 27 and 28 so that the sleeve members can pivot upwardly with respect to these arms. With certain types of implements mounted upon the tractor, it is desirable that these implements be allowed to float or rise and fall vertically with respect to the tractor in order to follow the contour of the ground. However, when mounting other types of implements upon this attaching structure it is essential that the implement be held in a relatively fixed vertical position and against vertical floating movement with respect to the tractor. These optional functions may be performed with the attaching structure of this invention by the provision of a pin 83 which may be optionally placed in registering openings in the members 48 and 49 and the ends of the respective arms 27 and 28. This position of the pins is illustrated in Figure 3. When an implement is to be mounted upon the tractor that must be allowed free vertical floating movement relative to the tractor, the pins 83 are removed and may be placed in other openings 84 passing only through the arms of the sleeve members 48 or 49. With other implements such as planters, or any other implement having laterally spaced ground engaging elements which must follow ground contour, the removal of both pins 83 permits the needed wobble action to allow the ground engaging units to float independently.

It has already been noted that the vertical links 52 and 53 are pivotally mounted at their lower ends upon the respective upright lug member 57, this pivotal connection providing relative rotation between the links 52 or 53 and the lugs 57 about longitudinal axes. The pivoting of the lugs 57 upon the rear ends of the arms 44 and 45 upon the pins 58 accommodates the necessary relative movement between the lugs 57 and the respective ends of the arms 44 and 45 during raising and lowering of the implement.

The pivotal mounting of the lower ends of the links 52 and 53 to the lugs 57 also accommodates lateral swinging of the drawbar 31 relative to the tractor when an implement is mounted upon the tractor which must be allowed to swing from side to side to follow in the path of the tractor as it is steered. Other types of implements when mounted upon the tractor must be held against lateral swinging relative to the tractor, and this is accomplished by the provision of a pin 85 receivable in registering openings in the links 52 and 53 and the respective lugs 57 and 58 above the pivotal connections of the links thereto. Relative movement between the links 52 and 53 and the drawbar is thus prevented and lateral swinging of the attaching structure on the tractor is avoided. Suitable openings 86 are provided in the links 52 and 53 to receive the pin 85 when lateral swinging of implement and drawbar relative to the tractor is desired.

The hydraulic ram 71 is a double acting ram unit and fluid is supplied thereto from the pump on the tractor through hose lines 87 and 88. The operator is thus able to secure full control of the lifting and the lowering mechanism. Extension of the piston rod 74 and cylinder 72, as pointed out before, acts through the upright 76, link 78 and member 80 to rock the shaft 18 in an anticlockwise direction as viewed in Figure 5. This is made possible by the provision of a flange 89 on the arm 80 engageable with the adjacent edge of the L-shaped link 78. This accommodates relative motion between the arm 80 and the link 78 when the implement is in operating position and the link 78 may be made rigid with the arm 80 so that the ram unit 71 has a positive action in both directions by the provision of a pin 90 which may optionally be passed through registering apertures in the arm 80 and link 78, thus making a unitary member out of the link 78 and the arm 80. This is important, for example, when it is desired to power operate the drawbar 31 by the action of the ram unit 71 to adjust its height to the height of the implement and to use the drawbar as a jack for elevating the tractor above the ground.

The operation of the implement attaching structure of this invention should be clear from the foregoing description. It may also be understood that the invention has been described in its preferred embodiment only, and that modifications may be made in the invention without departing from the spirit thereof or the scope of the appended claims.

What is claimed is:

1. A universal hitch mechanism for the attachment of implements to a tractor, comprising rock arms mounted on the tractor, power transmission means on the tractor connected to said rock arms for rocking the latter, implement hitch means below said rock arms pivotally connected to the tractor in draft-receiving relation to accommodate vertical movement thereof between operating and transport positions, a lifting link depending from each said rock arm and pivotally connected thereto for lateral swinging, vertically extending attaching parts on said hitch means, means pivotally connecting the lower end of each said lift link to one of said attaching parts to accommodate lateral swinging of the link and hitch means, each said attaching part having an opening formed therein above the pivotal connection of the associated lift link thereto, and said link having an opening formed therein registrable with the opening in said attaching part, and a locking pin optionally receivable in said openings to render the lift link substantially rigid against lateral swinging.

2. A universal hitch mechanism for the attachment of implements to a tractor, comprising a drawbar connected to the tractor in draft-receiving relation and having laterally spaced attaching elements for connection to an implement, laterally spaced rock arms mounted on the tractor above the drawbar, each said rock arm comprising a first arm mounted on the tractor for vertical swinging, power transmission means on the tractor operatively connected to each said first arm for swinging the latter to selected vertical positions, a second arm pivotally mounted on each said first arm for limited vertical swinging relative thereto, means for optionally securing respective first and second arms together to function as a single arm, and a lift link pivotally connecting each said second arm to said drawbar for lateral swinging of the latter.

3. The invention set forth in claim 2, wherein, in addition to the pivotal connection of the lift link to the drawbar, means is also provided for optionally connecting the drawbar to each said link at a second location to render said links substantially rigid against lateral swinging.

4. The invention set forth in claim 3, wherein said last mentioned connecting means comprises a locking pin receivable in registering openings in said link and said drawbar.

5. A universal hitch mechanism for the attachment of implements to a tractor, comprising a drawbar connected to the tractor in draft-receiving relation and having laterally spaced attaching elements for connection to an implement, laterally spaced rock arms mounted on the tractor above the drawbar, each said rock arm comprising a first arm mounted on the tractor for vertical swinging, power transmission means on the tractor connected to each said first arm for swinging the latter to selected positions, a second arm pivotally mounted on each said first arm, a vertically extending lift link pivotally connecting each said second arm to the drawbar, the pivotal connection of the second arm to the first arm accommodating vertical floating movement of the drawbar, and an abutment carried by the second arm spaced from its pivot on the first arm and engageable with the first arm to prevent relative pivoting thereof in one direction.

6. The invention set forth in claim 5, wherein registering openings are provided in said arms spaced from the pivotal connection therebetween, and a pin is optionally insertable in said openings to render said arms rigid.

7. The invention set forth in claim 5, wherein said second arm is in the form of an inverted U-shaped sleeve pivoted to the first arm near the axis thereof and having its transverse portion engaging the upper surface of the first arm at its free end to form therewith a unitary rock arm upon upward movement of the said first arm, the pivotal connection of the second arm to the first arm accommodating free vertical swinging of the second arm upwardly relative to the first arm.

References Cited in the file of this patent

UNITED STATES PATENTS

| | | |
|---|---|---|
| 2,223,002 | Ferguson | Nov. 26, 1940 |
| 2,379,225 | Fraga | June 26, 1945 |
| 2,420,530 | Evans | May 13, 1947 |
| 2,438,553 | Fraga | Mar. 30, 1948 |
| 2,461,885 | Estes | Feb. 15, 1949 |
| 2,483,565 | Strandlund | Oct. 4, 1949 |
| 2,567,736 | Silver et al. | Sept. 11, 1951 |
| 2,567,737 | Silver et al. | Sept. 11, 1951 |
| 2,567,738 | Silver et al. | Sept. 11, 1951 |
| 2,599,617 | Davis | June 10, 1952 |
| 2,602,389 | Markel | July 8, 1952 |
| 2,611,304 | Toland | Sept. 23, 1952 |
| 2,640,708 | Fraga | June 2, 1953 |
| 2,665,144 | Birdwell | Jan. 5, 1954 |
| 2,691,932 | Sawyer | Oct. 19, 1954 |